US011579569B2

(12) United States Patent
Lee et al.

(10) Patent No.: US 11,579,569 B2
(45) Date of Patent: Feb. 14, 2023

(54) APPARATUS AND METHOD FOR CONTROLLING SYSTEM

(71) Applicant: Daegu Gyeongbuk Institute of Science and Technology, Daegu (KR)

(72) Inventors: Junyoung Lee, Daegu (KR); Pyung Hun Chang, Daegu (KR); Byeonggi Yu, Yeoju-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 16/698,187

(22) Filed: Nov. 27, 2019

(65) Prior Publication Data

US 2020/0379415 A1    Dec. 3, 2020

(30) Foreign Application Priority Data

Jun. 3, 2019  (KR) ........................ 10-2019-0065242

(51) Int. Cl.
*G05B 6/02*    (2006.01)
*G05B 13/04*    (2006.01)

(52) U.S. Cl.
CPC ............. *G05B 6/02* (2013.01); *G05B 13/042* (2013.01)

(58) Field of Classification Search
CPC ................... G05B 6/02; G05B 13/042; G05B 2219/13095; G05D 13/60
USPC ........................................................... 700/31
See application file for complete search history.

(56) References Cited

U.S. PATENT DOCUMENTS

| 4,698,745 | A * | 10/1987 | Hiroi ...................... G05B 13/04 |
| | | | 700/37 |
| 9,082,079 | B1 * | 7/2015 | Coenen .................. G06N 3/049 |
| 9,296,474 | B1 * | 3/2016 | Nguyen ............... G05B 13/048 |
| 10,088,811 | B2 | 10/2018 | Chang et al. |
| 2004/0234039 | A1 * | 11/2004 | Karaus ................... A61B 6/102 |
| | | | 378/196 |
| 2007/0150076 | A1 | 6/2007 | Schmidt et al. |
| 2009/0198386 | A1 * | 8/2009 | Kim ....................... G05B 11/42 |
| | | | 700/298 |
| 2009/0248177 | A1 | 10/2009 | Rifai |
| 2009/0322275 | A1 * | 12/2009 | DePoi .................... G05B 11/42 |
| | | | 318/619 |
| 2016/0334793 | A1 * | 11/2016 | Celikkol ................. G01S 3/781 |
| 2017/0120909 | A1 * | 5/2017 | Oniwa .................. B60W 30/12 |
| 2018/0278853 | A1 * | 9/2018 | Ryu ....................... H04N 5/243 |

(Continued)

FOREIGN PATENT DOCUMENTS

| KR | 100507835 B1 | 8/2005 |
| KR | 20180032453 A | 3/2018 |
| KR | 101849464 B1 | 5/2018 |

OTHER PUBLICATIONS

KIPO, Office Action of KR 10-2019-0065242 dated Jul. 30, 2020.

*Primary Examiner* — Kenneth M Lo
*Assistant Examiner* — Mohammed Shafayet
(74) *Attorney, Agent, or Firm* — Lex IP Meister, PLLC

(57) ABSTRACT

A system control apparatus includes a proportional-integral-derivative (PID) controller configured to control a behavior of a system and having a gain, and a gain determiner configured to apply, to a set adaptive load model, a variable associated with an error that varies based on a load change of the system and adaptively vary the gain using the adaptive load model to which the variable associated with the error is applied.

14 Claims, 4 Drawing Sheets

(56) References Cited

U.S. PATENT DOCUMENTS

2019/0064753 A1* 2/2019 Zhang .................. A01G 9/18
2019/0354072 A1* 11/2019 Ogawa .................. G05B 6/02

* cited by examiner

APPARATUS AND METHOD FOR CONTROLLING SYSTEM

CROSS-REFERENCE TO RELATED APPLICATION(S)

This application claims the priority benefit of Korean Patent Application No. 10-2019-0065242 filed on Jun. 3, 2019, in the Korean Intellectual Property Office, the disclosure of which is incorporated herein by reference for all purposes.

BACKGROUND

1. Field

One or more example embodiments relate to an apparatus and method for controlling a system.

2. Description of Related Art

A proportional-integral-derivative (PID) controller configured to determine a behavior of a system has a proportional gain, an integral gain, and a derivative gain. These proportional, integral, and derivative gains are coupled to one another. Thus, determining a gain of a PID controller may be an issue of great concern to achieve a desired behavior of a system. There have been various methods performed to systematically discover a gain of a PID controller, and these may be generally based on a trial and error by a user. For example, Korean Patent Registration No. 10-0507835 discloses a method of selecting an optimal gain of a PID controller.

SUMMARY

According to an example embodiment, there is provided a system control apparatus. The system control apparatus includes a proportional-integral-derivative (PID) controller configured to control a behavior of a system and having a gain, and a gain determiner configured to apply, to a set adaptive load model, a variable associated with an error that varies based on a load change of the system, and adaptively vary the gain using the adaptive load model to which the variable associated with the error is applied.

The gain determiner may determine the gain using a time change rate of the adaptive load model.

When the determined gain is out of a set range, the gain determiner may determine the gain to be a first user set constant.

An output of the adaptive load model may be nonlinear with respect to the variable associated with the error.

The gain determiner may apply the variable associated with the error to a set stability model, and ensure stability of the system using the stability model to which the variable associated with the error is applied.

The gain determiner may apply a second user set constant to the stability model and ensure stability of the system.

The second user set constant may be selected such that a magnitude of the time change rate of the adaptive load model to which the variable associated with the error is applied is relatively greater than a magnitude of an output of the stability model to which the second user set constant is applied.

The variable associated with the error may be defined based on a position error of the system and a corresponding time change rate.

The gain determiner may initialize the gain to be a set value at a point in time at which a load of the system changes.

The system control apparatus may further include a sensor configured to sense a point in time at which a load of the system changes.

According to another example embodiment, there is provided a system control method. The system control method includes applying, to a set adaptive load model, a variable associated with an error that varies based on a load change of a system, adaptively varying a gain of a PID controller using the adaptive load model to which the variable associated with the error is applied, and determining a behavior of the system based on the gain of the PID controller.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
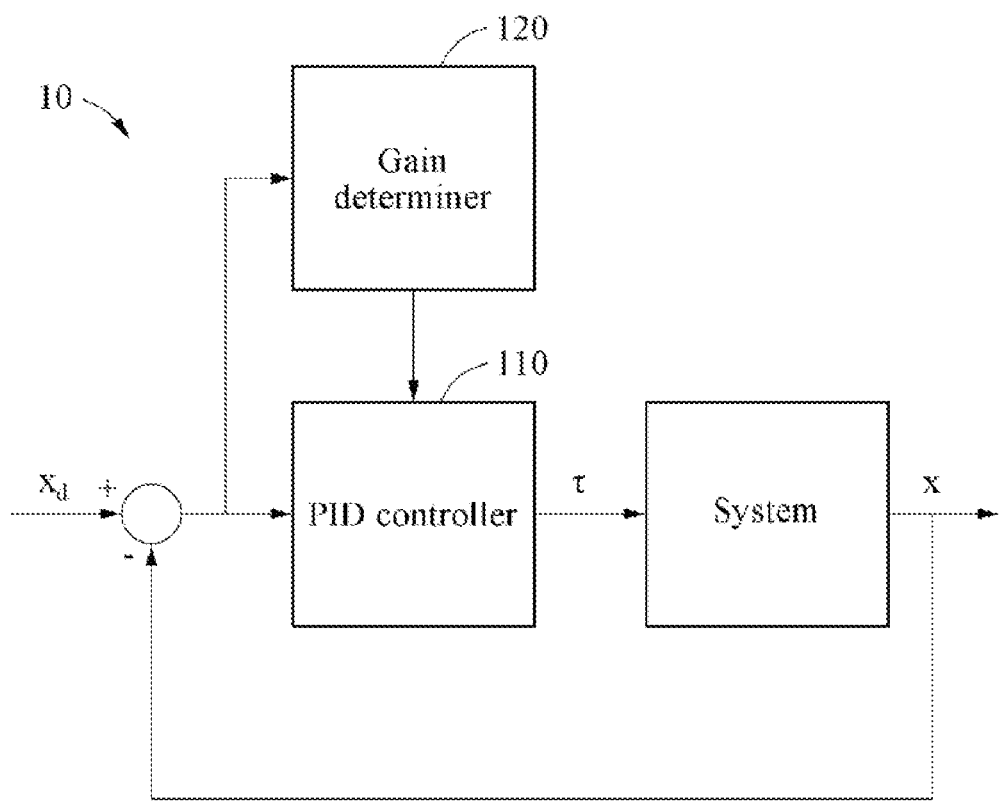
FIG. 1 is a diagram illustrating an apparatus for controlling a system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 4:
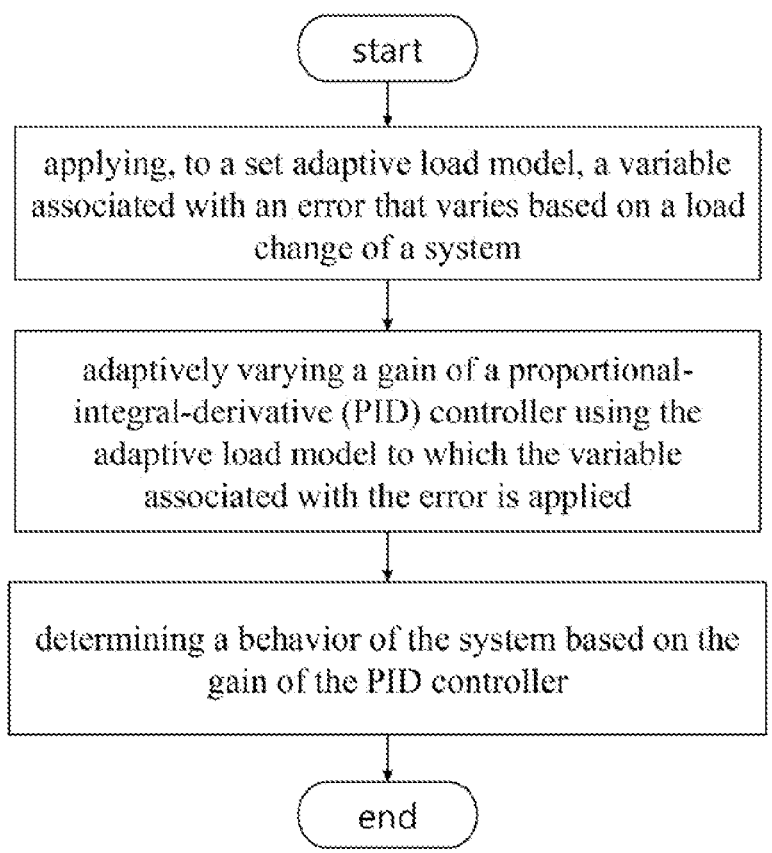
FIG. 4 is a flowchart illustrating a method of controlling a system according to an example embodiment.

FIG. 1 is a diagram illustrating an apparatus for controlling a system according to an example embodiment, and FIG. 4 is a flowchart illustrating a method of controlling a system according to an example embodiment. An apparatus for controlling a system will be hereinafter simply referred to as a system control apparatus, and a method of controlling a system will be hereinafter simply referred to as a system control method.

Referring to FIG. 1, a system control apparatus 10 includes a proportional-integral-derivative (PID) controller 110 configured to control a behavior of a system, and a gain determiner 120 configured to determine a gain of the PID controller 110. The system control apparatus 10 is configured to control a robot having N degrees of freedom (DOF), for example.

The system control apparatus 10 is configured to obtain an adaptive gain that maintains a sufficiently high level of robustness against a load change of the system. A standard form of the PID controller 110 configured to determine a behavior of the system is as follows.

$$\tau = K(e + T_D \dot{e} + T_I^{-1} \int_0^t e \, du) + \tau_{DC} \qquad \text{[Equation 1]}$$

In Equation 1, $\tau$ denotes an output of the PID controller 110 configured to determine a behavior of the system. K denotes a gain, or a proportional gain, of the PID controller 110. $T_D$ and $T_I$ denote a derivative gain and an integral gain, respectively. In addition, e denotes a position error which is represented by Equation 2 below.

$$e = x_d - x \qquad \text{[Equation 2]}$$

In Equation 2, x denotes an input of the system control apparatus 10, and represents an actual path of a joint included in the system. $x_d$ represents a desired path of the joint that is desired by a user. x and $x_d$ are presented by the following equations, for example.

$$x_d = \begin{matrix} q_d \\ \dot{q}_d \\ \ddot{q}_d \end{matrix} \qquad \text{[Equation 3]}$$

$$x = \begin{matrix} q \\ \dot{q} \\ \ddot{q} \end{matrix} \qquad \text{[Equation 4]}$$

In Equations 3 and 4, q denotes a displacement vector of the joint included in the system. Thus, x and $x_d$ may be represented by the displacement vector, a velocity vector, and an acceleration vector of the joint included in the system.

For example, in the standard form of the PID controller 110, $\tau_{DC}$ is a direct current (DC) bias or a null value to maintain the system being in a normal state. This may be set based on an environment of the system.

The standard form of the PID controller 110 may be represented in a discrete time domain. That is, in a digital execution environment, the proportional gain, the derivative gain, and the integral gain may be determined as represented by the following equations, respectively.

$$K = \frac{\overline{M}(s) \times K_D}{L} \qquad \text{[Equation 5]}$$

$$T_D = K_D^{-1} \qquad \text{[Equation 6]}$$

$$T_I = K_P^{-1} \times K_D \qquad \text{[Equation 7]}$$

In the foregoing equations, s denotes a variable associated with an error that varies based on a load change of the system, which may be represented by Equation 8.

$$s = \dot{e} + \lambda e \qquad \text{[Equation 8]}$$

In Equation 8, e denotes the position error, and $\lambda$ denotes a slope gain. That is, the variable associated with the error may be represented by the position error and a corresponding time change rate, and the slope gain.

Referring to Equations 5 through 8 above, $\overline{M}(s)$ denotes an adaptive gain of which an output varies in response to an input of the variable associated with the error. $K_D$ and $K_L$ denote a first parameter and a second parameter, respectively, to determine a gain, and L denotes a control period. The first parameter and the second parameter, and the control period may be set by the user.

Based on the foregoing equations, the adaptive gain of which the output varies based on the variable associated with the error which varies based on a load change of the system is included in the standard form of the PID controller 110, and thus a gain of the PID controller 110 may be adaptively regulated based on a change in a load of the system.

The adaptive gain $\overline{M}(s)$ included in the standard form of the PID controller 110 may be defined by the following equation, and the gain determiner 120 may determine a gain of the PID controller 110 using the following equation.

$$\begin{cases} \dot{\overline{M}}_{ii} = -\alpha_{ii}\left(\dfrac{d}{dt}J_i(s_i) + \delta s_i^2\right) & \text{if } \overline{M}_{ii} \geq \overline{M}_{\overline{ii}} \\ \overline{M}_{ii} = \overline{M}_{\overline{ii}} & \text{otherwise} \end{cases} \quad \text{[Equation 9]}$$

In Equation 9, i and ii denote an i-th element of a vector and an ii-th diagonal element of a diagonal matrix, respectively. In addition, $\alpha_{ii}$ denotes a positive adaptive gain that determines a regulating rate of an adaptive gain $\overline{M}_{ii}$.

In detail, in Equation 9, $\overline{M}_{\overline{ii}}$ functions as an initial value of $\overline{M}_{ii}$ and a lower bound thereof. Thus, when $\overline{M}_{ii}$ obtained based on Equation 9 is greater than or equal to $\overline{M}_{\overline{ii}}$, $\overline{M}_{ii}$ determined by an equation indicated in a first line of Equation 9 may be used. When $\overline{M}_{ii}$ is less than $\overline{M}_{\overline{ii}}$, $\overline{M}_{ii}$ may be set to be $\overline{M}_{\overline{ii}}$. This is for a gain of the PID controller 110 not to be out of a set range.

A time change rate of $\overline{M}_{ii}$ indicated in the first line of Equation 9 may be classified broadly into two terms.

First, $J_i(s_i)$ denotes a square function using, as an input, a variable $s_i$ associated with an error that varies based on a load change of the system, which is also referred to herein as an adaptive load model. The adaptive load model corresponds to a main parameter that enables a value of $\overline{M}_{ii}$ to be adaptively regulated based on a load change of the system. A gain of the PID controller 110 may be determined using a time change rate of such adaptive load model.

In addition, a function multiplied by $\delta$ and a square of $s_i$ is referred to as a stability ensuring model to ensure stability of the system. In general, a magnitude of an output of the adaptive load model is significantly greater than a magnitude of an output of the stability ensuring model, and the adaptive load model may thus be construed as dominantly determining a gain of the PID controller 110.

The adaptive load model $J_i(s_i)$ may be defined by the following equation. That is, an output of the adaptive load model may be nonlinear with respect to the variable associated with the error.

$$J_i(s_i) = \dfrac{1}{2}s_i^2 \quad \text{[Equation 10]}$$

In addition, $\alpha_{ii}$, $\delta$ and $\overline{M}_{\overline{ii}}$ are all user set constants that are set by the user, and not determined through a trial and error.

Hereinafter, how the system control apparatus 10 operates will be described in detail.

When a load is applied to the system, an inertia of the system increases and a position error of a joint included in the system also increases. This results in an increase in a variable associated with an error, which results in an increase in an output of the adaptive load model and in a positive value of a time change rate of the adaptive load model. Since $\delta$ which is a user set constant of the stability ensuring model is sufficiently small, a term of the time change rate of the adaptive load model may dominantly determine a time change rate of $\overline{M}_{ii}$. Thus, $\overline{M}_{ii}$ decreases until $\overline{M}_{ii}$ reaches its lower bound $\overline{M}_{\overline{ii}}$. While $\overline{M}_{ii}$ is being maintained as $\overline{M}_{\overline{ii}}$, the variable associated with the error may exponentially decrease by Equation 8 above, which greatly reduces an output of the adaptive load model and greatly increases $\overline{M}_{ii}$. What is described in the foregoing is also applied when the load is removed from the system.

Figure 2:
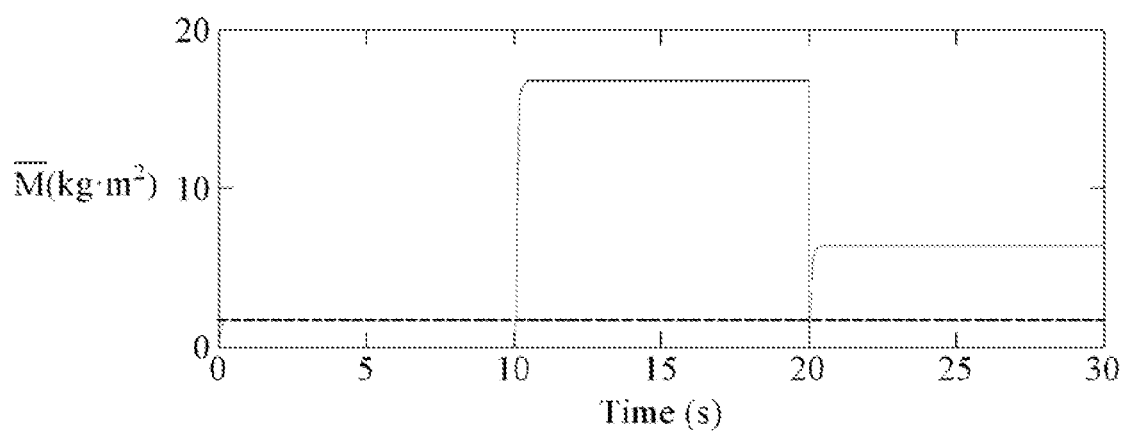
FIG. 2 is a graph illustrating an output of an adaptive gain based on a lapse of time that is measured using an apparatus and method for controlling a system according to an example embodiment.
Figure 3:
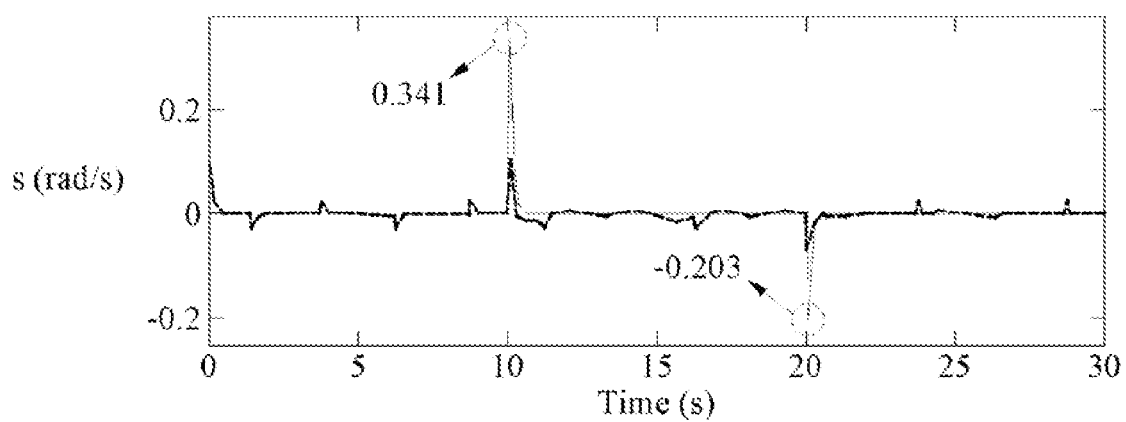
FIG. 3 is a graph illustrating a variable associated with an error based on a lapse of time that is measured using an apparatus and method for controlling a system according to an example embodiment.

FIG. 2 is a graph illustrating an output of an adaptive gain based on a lapse of time that is measured using a system control apparatus and method according to an example embodiment. FIG. 3 is a graph illustrating a variable associated with an error based on a lapse of time that is measured using a system control apparatus and method according to an example embodiment.

Referring to FIGS. 2 and 3, illustrated are a change in an adaptive gain $\overline{M}_{ii}$ and a change in a variable s associated with an error, in a time interval between 0 second (sec) and 10 sec to which 0 kilogram (kg) of load is applied to a system, in a time interval between 10 sec and 20 sec to which 10 kg of load is applied to the system, and in a time interval between 20 sec and 30 sec to which 5 kg of load is applied to the system. A broken line indicates a result obtained using an existing system control apparatus and method, and a solid line indicates a result obtained using a system control apparatus and method according to an example embodiment.

It is verified based on the graphs that, when there is a change in load of the system over time, the existing system control apparatus and method may use a fixed constant gain for a PID controller, and thus a gain may not be regulated adaptively in response to such a load change of the system. However, it is verified based on the graphs that, using the system control apparatus and method according to an example embodiment, a gain of a PID controller may change adaptively to each load.

In addition, the system control apparatus and method according to an example embodiment may initialize a gain of the PID controller at a point in time at which a load of the system changes, for example, in the time interval between 10 sec and 20 sec as illustrated in FIGS. 2 and 3. To initialize the gain of the PID controller, the system control apparatus may include a sensor to sense such point in time at which a load of the system changes. When the point at which a load of the system changes is sensed through the sensor, the gain of the PID controller may be initialized to be a set value, and regulated adaptively to the changed load of the system and then determined to be a gain of the PID controller.

The system control apparatus and method described herein according to an example embodiment may have a desirable level of robustness even against a relatively great load applied to a system.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

What is claimed is:

1. A system control apparatus comprising:
   a proportional-integral-derivative (PID) controller configured to control a behavior of a system, wherein an output of the PID controller is defined based on parameters including a proportional gain, a derivative gain, an integral gain, and a position error, wherein the proportional gain is defined based on at least an output of an adaptive load model, and wherein the output of the adaptive load model is defined differently from the output of the PID controller; and
   a gain determiner configured to:
      apply, to the adaptive load model, a variable associated with an error that varies based on a load change of the system, wherein the variable associated with the error is different from the parameters and the output of the PID controller, and is defined based on the position error, a time derivative of the position error, and a slope gain of the system; and
      adaptively vary the proportional gain using the output of the adaptive load model to which the variable associated with the error is applied,
   wherein the proportional gain is defined based on an adaptive gain,
   wherein the gain determiner is further configured to
   determine the adaptive gain to be a first user set constant in order to prevent the proportional gain from going out of a set range, and
   vary the adaptive gain based on a negative value of a positive adaptive gain constant set by the user multiplied by a sum of (i) a time derivative of the output of the adaptive load model and (ii) a stability ensuring model in order to keep the proportional gain in the set range, and
   wherein the stability ensuring model is defined as a second user set constant multiplied by a square of the variable associated with the error.

2. The system control apparatus of claim 1, wherein the output of the adaptive load model is nonlinear with respect to the variable associated with the error.

3. The system control apparatus of claim 1, wherein the gain determiner is configured to apply the variable associated with the error to the stability ensuring model, and ensure stability of the system using the stability ensuring model to which the variable associated with the error is applied.

4. The system control apparatus of claim 3, wherein the gain determiner is configured to apply the second user set constant to the stability ensuring model and ensure the stability of the system.

5. The system control apparatus of claim 4, wherein the second user set constant is selected such that a magnitude of the time change rate of the adaptive load model to which the variable associated with the error is applied is relatively greater than a magnitude of an output of the stability ensuring model to which the second user set constant is applied.

6. The system control apparatus of claim 1, wherein the gain determiner is configured to initialize the proportional gain to be a set value at a point in time at which the load of the system changes.

7. The system control apparatus of claim 1, further comprising:
   a sensor configured to sense a point in time at which the load of the system changes.

8. The system control apparatus of claim 1, wherein the output of the adaptive load model is defined based on a square of the variable associated with the error.

9. The system control apparatus of claim 1, wherein the variable associated with the error is defined based on adding the time derivative of the position error to a product of the position error and the slope gain.

10. The system control apparatus of claim 1, wherein the gain determiner is further configured to determine a time derivative of the adaptive gain to be the negative value of the positive adaptive gain constant set by the user multiplied by the sum.

11. A system control method comprising:
   applying, to an adaptive load model, a variable associated with an error that varies based on a load change of a system, wherein the variable associated with the error is defined based on a position error, a time derivative of the position error, and a slope gain of the system, an output of a proportional-integral-derivative (PID) controller is defined based on parameters including a proportional gain, a derivative gain, an integral gain, and the position error, and the proportional gain is defined based on at least an output of an adaptive load model, and wherein the output of the adaptive load model is defined differently from the output of the PID controller, and the variable associated with the error is different from the parameters and the output of the PID controller;
   adaptively varying the proportional gain using the output of the adaptive load model to which the variable associated with the error is applied; and
   determining a behavior of the system based on the proportional gain of the PID controller,
   wherein the proportional gain is defined based on an adaptive gain,
   wherein the adaptively varying the proportional gain comprises
      determining the adaptive gain to be a first user set constant in order to prevent the proportional gain from going out of a set range, and
      varying the adaptive gain based on a negative value of a positive adaptive gain constant set by the user multiplied by a sum of (i) a time derivative of the output of the adaptive load model and (ii) a stability ensuring model in order to keep the proportional gain in the set range, and wherein the stability ensuring model is defined as a second user set constant multiplied by a square of the variable associated with the error.

12. The system control method of claim 11, wherein the output of the adaptive load model is defined based on a square of the variable associated with the error.

13. The system control method of claim 11, wherein the variable associated with the error is defined based on adding the time derivative of the position error to a product of the position error and the slope gain.

14. The system control method of claim 11, wherein the varying the adaptive gain comprises determining a time derivative of the adaptive gain to be the negative value of the positive adaptive gain constant set by the user multiplied by the sum.

* * * * *